United States Patent [19]
Klingman

[11] Patent Number: 5,799,285
[45] Date of Patent: Aug. 25, 1998

[54] SECURE SYSTEM FOR ELECTRONIC SELLING

[76] Inventor: Edwin E. Klingman, 3000 Hwy. 84, San Gregorio, Calif. 94074

[21] Appl. No.: 708,036

[22] Filed: Aug. 30, 1996

Related U.S. Application Data

[63] Continuation-in-part of Ser. No. 684,135, Jul. 19, 1996, which is a continuation-in-part of Ser. No. 660,529, Jun. 7, 1996, Pat. No. 5,729,594.

[51] Int. Cl.$^6$ .............................. H04M 11/00; H04L 12/22
[52] U.S. Cl. .............................. 705/26; 705/27; 379/93.12; 902/5
[58] Field of Search .............................. 705/26, 27, 44; 379/142, 93.12, 93.02, 93.03, 93.04; 902/2, 4, 5

[56] References Cited

U.S. PATENT DOCUMENTS

| | | | |
|---|---|---|---|
| 5,301,246 | 4/1994 | Archibald et al. | 380/23 |
| 5,664,115 | 9/1997 | Fraser | 705/37 |
| 5,715,314 | 2/1998 | Payne et al. | 380/24 |
| 5,727,163 | 3/1998 | Bezos | 235/379 |
| 5,732,400 | 3/1998 | Mandler et al. | 705/26 |

OTHER PUBLICATIONS

"Earthlink announces 'TOTALACCESS' Complete Low Cost Internet Access," M2 PRESSWIRE, M2 Communications Ltd, May 24, 1995.

*Primary Examiner*—Tariq R. Hafiz
*Assistant Examiner*—Jason W. Rhodes
*Attorney, Agent, or Firm*—Claude A.S. Hamrick; Oppenheimer W. Donnelly; Maryam Imam

[57] ABSTRACT

A remote communication system for facilitating secure electronic sales of products, wherein a suitable seller input device in association with a local seller data transmission system couples the seller to a packet network system for communicating to a remote receiver/decoder apparatus to download registration data to the seller system. Upon retrieving a telephone toll number from the remote apparatus, a telcom network communication link for communicating the telephone number from the seller to the remote receiver allows the seller to upload the product that is to be offered for sale to the remote apparatus. The telcom connection, linking the seller system to the remote apparatus may also include a 900 number billing system whereby a fee is assessed and charged at a rate determined by the toll connection provider after uploading the product.

17 Claims, 4 Drawing Sheets

SECURE SYSTEM FOR ELECTRONIC SELLING

CROSS REFERENCE TO RELATED APPLICATIONS

This application is a continuation-in-part of my prior application Ser. No. 08/684,135, filed Jul. 19, 1996, entitled "SECURED ELECTRONIC RATING SYSTEM" which is also a continuation-in-part of my prior application Ser. No. 08/660,529, filed Jun. 7, 1996, now U.S. Pat. No. 5,729,594 entitled "ON-LINE SECURED FINANCIAL TRANSACTION SYSTEM THROUGH ELECTRONIC MEDIA."

BACKGROUND OF THE INVENTION

1. Field of the Invention

The present invention relates generally to electronic transaction communication systems and more particularly to a system providing secure communications using means available on most telephone equipment, either POTS (plain old telephone system) or ISDN (Integrated Services Digital Network), for electronically supplying products to a distributor for sale in the open market.

2. Description of the Prior Art

In current and traditional product marketplaces, small sellers of goods are often restricted and in some cases eliminated from competition due to the presence of an uneven playing field. The primary problem facing the small seller of goods is "shelf space" and more accurately, lack thereof. This is in part attributed to the number of goods being offered for sale exceeding the amount of physical shelf space available in retail outlets to fit the goods. As a result of having limited "shelf space", retail or shelf owners have eliminated the majority of otherwise qualified products from the marketplace. Traditionally, those products with the highest turn-over rates have been most desirable for sale to retail owners or owners of "shelf space." In order for a product to achieve rapid turn-over, it would have to be heavily marketed, advertised and supported, all of which reduce or eliminate the small provider's access to market its goods due to the expenses associated therewith.

The "chain store" phenomenon, i.e. franchises and the like, presents yet a further obstacle to small sellers. In order to access "shelf space" in large retail chain stores, product providers must negotiate complex contracts, guarantee significant advertising, and provide large quantities of products with the proviso that much of the products may be returned to the provider if sales do not meet expectations. The net effect of the above is that the small manufacturer of hard or soft goods is almost eliminated from the marketplace. The problem then exists of providing small sellers of goods efficient access to the marketplace.

With the advent of electronic transactions being conducted on the Internet transmission media, sellers and buyers can conduct commercial transactions without the need for physical shelf space. Prior art techniques have attempted to solve the problems associated with conducting electronic commercial transactions on the Internet to a certain extent. However, there still remains the problem of whether the product purchased on the Internet comes from a legitimate source. In other words, the identity of both parties, the buyer as well as the seller, is of utmost importance for the purpose of maintaining security in electronic commercial transaction. Therefore, the need exists to effectively identify the seller in order to effectuate legitimate sales of products through electronic media.

Electronic commerce is currently largely based on encryption and digital signature technology as a means of identifying the buyer and seller in Cyberspace. With reference to the selling of code (information) in Cyberspace, Vinton Cerf, VP Data Architecture at MCI, [Communication Week, Jul. 1, 1996, p. 63] stated: "How can I tell if the downloaded code comes from a legitimate source? Should I be using digital signatures? If the answer is yes, then a whole administrative structure is needed. We are some time from having that in place."

Because of the ephemeral nature of addresses in Cyberspace, much effort is required to identify both parties to a transaction. This is due to the fact that Internet Protocol (IP) addresses are not tightly coupled to the real (physical) world and also because addresses can be easily changed in Cyberspace due to the "postcard" like propagation over a packet network such as the Internet media. Prior art techniques have attempted to hide critical information using encryption schemes, and to provide third party identification of participants. While possibly serving the needs of large corporations, such schemes do not scale well. That is, when millions of encryption keys must be distributed and accounted for, there must be a significant administration structure in place.

These problems were addressed on behalf of the buyer by two copending U.S. patent applications entitled "SECURED ELECTRONIC RATING SYSTEM" filed on Jul. 19, 1996 by Klingman and "ON-LINE SECURED FINANCIAL TRANSACTION SYSTEM THROUGH ELECTRONIC MEDIA" filed Jun. 7, 1996 by Klingman. These inventions solved the ephemeral nature of Cyberspace addresses by using Public Switched Telephone Network (PSTN) addresses, which are generally tied to physical locations in real space.

The inventions addressed the problem of security of information by using direct connection over the PSTN in place of packet ("postcard") transmission over the (open) Internet. As explained in aforementioned copending patent applications, prior art financial systems are based on the Transport level in the Open Systems Interconnection (OSI) seven layer architecture, while the Klingman inventions utilize financial systems coupled to the Physical layer in the OSI scheme. The resultant system makes optimal use of two networks, the switched (PSTN) network, and the packet (Internet) network, to achieve low cost product presentation (TRY) and secure product transaction (BUY) and evaluation (SCORE). In addition there are beneficial ease-of-use features associated with the use of these inventions. However, there remains the problem of how to assure that the product being sold came from a legitimate source particularly when the seller wishes to present his/her product in a traditional "classified advertisement" setting but do so through electronic media.

As earlier stated, the more important problem, from the seller's perspective is the cost barrier that prevents small sellers from distributing their products in the most efficient channels of commerce—chain stores, etc.. While prior art electronic commerce tends to lessen this aspect of the problem, there is still a considerable effort and expense associated with registering products for sale due to the requirements of encryption, authentication, and keys.

Moreover, while the buyer can purchase directly from the seller using the scheme taught in the TRY-BUY application, in actuality, the costs associated with each seller acquiring a 900 number and maintaining a 24-hour "presence" are likely to be burdensome, particularly to small sellers, such that a "centralized" distribution scheme is desirable.

Accordingly, the need exists for a secure communications scheme to supply products for distribution and sale to the general public through electronic media thereby allowing small sellers to compete in the marketplace on an even playing field with large-sized merchants while maintaining the identity of the seller to assure legitimacy of sale.

SUMMARY OF THE INVENTION

It is therefore a principal object of the present invention to provide a secure commercial transaction system that uses state-of-the-art computer telcom to provide secure selling capability of goods.

Another object of the present invention is to provide a system of the type described herein to register the source of the product being sold, i.e. the seller, with a distributor for ensuring legitimacy of the same.

It is yet another object of the present invention to provide a system of the type described herein which uses the '900' numbering system or a similar system to assess and collect user tolls for registering products to be sold with a distributor.

Still another object of the present invention is to provide a system for performing commercial transactions wherein small sellers of product goods are afforded the same opportunity as other sellers to market their products to the general public.

It is a further object of the present invention to provide a commercial transaction system wherein the accounting, billing and collecting funds may be managed by telco.

It is another object of the present invention to provide a commercial transaction scheme for offering a product for sale based upon a multi-network solution in which the distinction between switched and packet routing networks are used to optimately partition functionality.

It is yet another object of the present invention to provide a system wherein small-shop software developers can market their products to the public inexpensively.

It is a further object of the present invention to provide a commercial transaction system for offering products for sale wherein the system employs point-to-point protocol (PPP), thereby allowing any hardware or operating system to negotiate a common information transfer protocol with dissimilar hardware and operating systems software.

Briefly, a preferred embodiment of the present invention includes a remote communication system for facilitating secure electronic sales of products wherein a suitable seller input device in association with a local seller data transmission system couples the seller to a packet network system for communicating to a remote receiver/decoder apparatus to download registration data to the seller system. Upon retrieving a telephone toll number from the remote apparatus, a telcom network communication link for communicating the telephone number from the seller to the remote receiver allows the seller to upload the product that is to be offered for sale to the remote apparatus. The telcom connection, linking the seller system to the remote apparatus may also include a 900 number billing system whereby a fee is assessed and charged at a rate determined by the toll connection provider after uploading the product.

These and other objects and advantages of the present invention will no doubt become apparent to those skilled in the art after having read the following detailed description of the preferred embodiments illustrated in the several figures of the drawing.

DETAILED DESCRIPTION OF THE PREFERRED EMBODIMENTS

Figure 1:
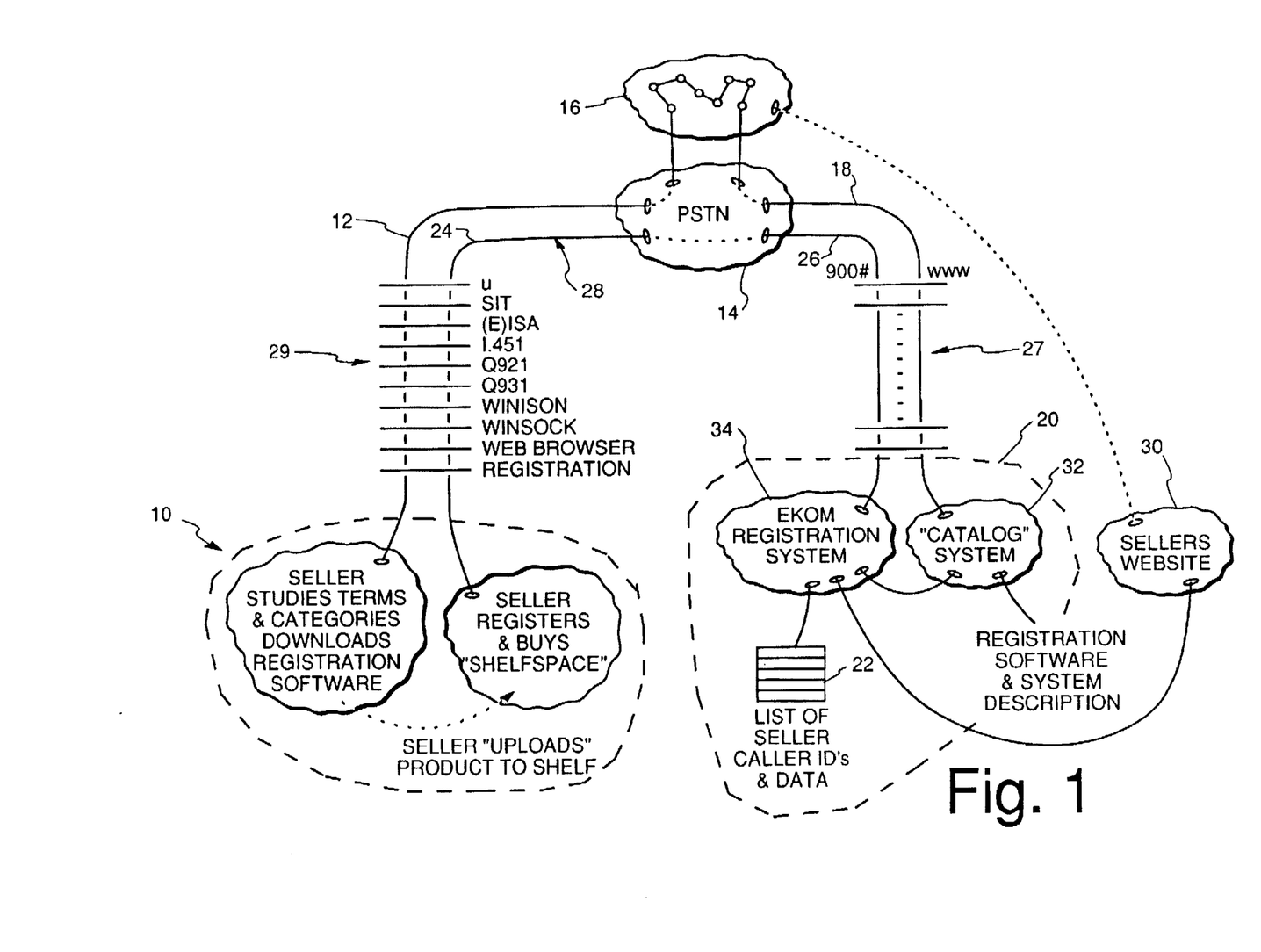
FIG. 1 illustrates a preferred embodiment of the present invention in conceptual diagrammatical form.

Referring now the to the drawing, FIG. 1 shows in conceptual diagrammatic form two channels for establishing communications between a seller and a remote system. As such, a seller subsystem 10 and a seller local connection 12 are coupled through a switching system or network 14 and Internet transmission media 16 to a remote connection 18. Remote connection 18 in turn is coupled to a remotely located distributor subsystem 20. Distributor subsystem 20 accesses the seller identification list storage location 22 wherein caller identification (caller ID) numbers associated with the seller subsystem reside. Seller subsystem 10 is additionally coupled through a SELL local telcom connection 24 to switching network 14 which is in turn coupled through a SELL remote telcom connection 26 to distributor subsystem 20.

Typically, a seller subsystem 10 such as shown in the FIG. 1, is a personal computer (PC) that may be an IBM compatible PC including a monitor (not shown) for the purpose of viewing uploaded or downloaded software products. A seller subsystem would typically further include hardware drivers, application software, plug-in hardware cards and controllers, etc. similar to those described in detail in a copending U.S. patent application entitled "On-Line Secured Financial Transaction System Through Electronic Media" by Klingman filed on Jun. 7, 1996 herein incorporated by reference and hereinafter referred to as the "TRY-BUY application".

The hardware and drivers employed in seller subsystem 10 (in FIG. 1) are the same as those described in the user subsystem 10 disclosed in the TRY-BUY application. A distributor subsystem 20 may be implemented and maintained by a third party (a distributor). Alternatively, the distributor subsystem may be programmed to operate automatically as a "classified advertisement" agency wherein the seller pays fees for its use. The system advertises the seller's product, but the sale of the product is to buyers who pay the seller directly.

As discussed in the TRY-BUY application, seller subsystem 10 uses either ISDN lines or POTS lines to connect to the local connection 12 and the SELL local telcom connection 24. The local connection 12 is a WEB connection through the Internet transmission media 16 which consists of many routers and switches and is a packet routing network structure. More detail regarding local connection is available in the TRY-BUY application. Internet media 16 connects the local connection 12 to the remote connection 18. The SELL local telcom connection 24 on the other hand, is a direct telco connection through switching system 14 to the SELL remote telcom connection 26. The remote connection 18 and SELL remote telcom connection 26 connect to the same interface layers as discussed in the aforementioned TRY-BUY application.

In fact, the Open Systems Interconnection (OSI) seller interface layers 29 shown on the left side of FIG. 1 which are the same as the OSI layers 27 on the right side of FIG. 1 are the same as those discussed in the TRY-BUY application. In prior art schemes, the financial systems are based on interfacing to the Transport layer of the OSI seven-layer architecture whereas the financial system taught in the TRY-BUY application is coupled to the Physical layer of the OSI scheme. The latter approach is similarly employed in the present invention wherein the resulting system makes optimal use of two networks, the switched public services telecommunication network (PSTN) network, and the packet (Internet) network to achieve low cost product presentation and secure product transaction and evaluation thereby addressing the problem of security of information by using direct connection over the PSTN in place of packet ("Postcard") transmission over the (Internet). The present invention utilizes the physical layer coupling to the financial system to minimize the cost and to ease the access to the distribution systems.

In FIG. 1, the path that is utilized to transfer products being sold from the seller subsystem 10 to the distributor server 20 is via a direct physical connection through the switched, secure, network 14 rather than through the open unsecure packet network 16. Note that this approach requires neither encryption, digital signature authentication, nor an extensive administration in order to assure a legitimate source of the code, i.e. a legitimate seller. This is not to mean that "bad" code cannot be distributed, but rather that the source of the code is identifiable using physical addresses (or IP addresses), rather than untraceable addresses as can be the case in prior art Cyberspace utilization. This level of traceability or identification is further improved to legitimize the source as will be later described.

Given the practical requirement of centralized distribution, how is the seller to obtain "shelf space"? In effect, the simplest way is for the seller to "buy" shelf space on the electronic media. This can be accomplished in a manner as disclosed in the TRY-BUY application in which the ultimate buyer acquires the products. The means by which this is accomplished focuses on the 900 number which is a toll numbering system offered by PSTNs and carriers, and also focus is placed on the "free" distribution available via both 800 toll free numbering systems and the Internet transmission media.

Operation of the System

In FIG. 1, incorporated within the seller subsystem is an IBM PC clone or similar computer which is coupled to the distributor subsystem 20 via either the Internet transmission media 16 or using an 800 number telephone connection. Through the Internet transmission media 16, the seller browses the net and locates a web site belonging to a distributor such as that offered by the distributor subsystem 20. Distributor subsystem 20 makes available to the seller registration/distribution software wherein detailed description of the operation of the system including registration information and a description of the steps required to download the registration/distribution software is provided to a potential seller. Within the distributor system 20, this information is available at the distributor's web site, commonly referred to as web pages. An example of this is where the distributor's web site offers potential sellers instructions for downloading the registration software using FTP, Netscape Navigator, Microsoft Explorer, or other widely available, easy-to-use, web browsers and the like. The distributor's portion of the preferred system software is written in JAVA to allow the seller the maximum choice of computer equipment. This is so due to the platform independence offered by JAVA as disclosed in the TRY-BUY application.

Seller Registration

Referring again to FIG. 1, the seller, after studying the system description offered by the distributor decides to register his/her products on the Internet. The seller does so by downloading the registration software resident in the distributor's subsystem 20 to the local subsystem 10 through the Internet transmission media 16 (or through an 800 toll free telephone connection). The hardware used to perform this downloading in the distributor's subsystem 20 and the seller's subsystem 10 is the same as that described in the TRY-BUY application.

The preferred implementation of the registration software is in the form of a "plug-in" for Netscape Navigator, or other simple to use programs such as a self-extracting file. As indicated above, in FIG. 1, the seller interface layers 29 as well as the distributor interface layers 27 are the same as those shown in FIG. 4 of the TRY-BUY application, respectively. Similarly, the hardware as well as the software drivers employed in seller's subsystem 10 remain the same as those described in the TRY-BUY application. The preferred implementation shown in FIG. 1 uses ISDN connections to couple seller's subsystem 10 to the switching network 14 through connections 12 and 24. However, the system can also operate using POTS lines in the same fashion as ISDN only at a slower connection and communication speeds.

Upon downloading the registration software form and information from the distributor's subsystem 20, the seller completes the registration form preferably off-line. Although the registration software may also be completed by the seller while the seller remains on-line connected to the distributor's subsystem 20. The seller then dials a 900 telephone toll number available to the seller either from the distributor's web site or included with the downloaded registration information. The 900 number call is established by the seller to the distributor using the seller's subsystem 10, through the SELL local telcom connection 24 and through the switched system 14, to the SELL remote telcom connection 26 and finally to the distributor subsystem 20. The seller's subsystem 10 and the distributor's subsystem 20 begin a point-to-point (PPP) or multi-link point-to-point (PPP, BACP, MLP, etc.) negotiations in order to establish the 900 call. This may optionally include the use of passwords handled by the password authentication protocol (PAP) or challenge/handshake authentication protocol (CHAP), both of which are commonly supported in PPP implementations.

After successful negotiations of the PPP protocol the EKOM registration system 34 included in the distributor subsystem 20 receives registration information provided by the seller from seller subsystem 10 and stores it. The EKOM registration system 34 then records the seller's caller identification number (caller ID) which was presented to the distributor's subsystem during the initial set-up of the incoming 900 call but held in suspense by the distributor's subsystem until successful PPP linkage. Caller ID numbers are a recently available feature, offered by telco for identifying a caller by providing the telephone number of the caller to the party receiving the call. This feature is optional to telephone users where the users are given the choice of disabling or suppressing their caller ID feature through telco. In the present invention, the seller must choose to have this feature, otherwise, suppression of the seller's caller ID number will result in the software (residing within the distributor's subsystem 20) to communicate to the seller that the 900 call will be rejected and the connection will be terminated. At this point, the seller must unsuppress his/her caller ID feature and retry the connection to register with the distributor subsystem.

The caller ID which is now available on North American PSTNs provides a major security feature of the system that will allow call-back confirmation and will also allow the distributor's system to cross-check the seller's caller ID number with the seller's telephone number, the latter being provided by the seller when the seller completes the registration form and uploads the same to the distributor subsystem. That is, upon a successful connection of the 900 telephone connection, the seller subsystem 10 uploads registration data or information upon completion of the distributor's registration form through path 28 to the distributor's subsystem 20. Within the uploaded registration information, is included the seller's telephone number (if requested by the distributor) and the seller's telephone number can be extracted from the registration information and cross-checked against the seller's caller ID number to verify the legitimacy of the source of the product being sold, i.e. the seller. For this purpose, when the seller's caller ID number is first received by the distributor subsystem 20 during the 900 call set up, it is stored in seller's ID list storage location 22 within the distributor subsystem 20. The distributor's subsystem 20 downloads the registration form, which is built into the registration software initially downloaded through the Internet or 800 number connection, to the seller after PPP negotiations and caller ID recording. As earlier stated, the form that is downloaded through the 900 toll connection to the seller is completed perhaps off-line to save time on the toll call (although this may not be necessary since toll calls are not necessarily time metered but can be flat fee). In any event, the seller completes the registration form which requires at a minimum the following information:

Seller Name
Product Name
Seller's Tel #
Seller's Address
Seller's Password
Seller's Price of Product
Seller's Preferred Payment Plan
Seller's Product Description
Other information as appropriate
Possible Product Graphics
Seller's Agreement to Terms
Seller's HTML Web Link, if existent
Seller's "Demo" Applets or equivalent As mentioned above, to ensure legitimacy of the seller, the seller's telephone number which may be more than one number, must match the seller's caller ID in order to successfully complete the registration. In addition, a password is included for future communication between the seller and the distributor. As indicated above, the seller includes as a part of the registration information, input regarding the price of the product being sold and the seller/distributor terms and conditions agreed upon by the parties.

Additionally, the liabilities of each party may be included in the terms and conditions of the seller/distributor agreement. For instance, the seller may be required to submit this product to a product evaluation system (or scoring system) such as the one taught in a copending U.S. patent application by Klingman filed Jul. 19, 1996 and entitled "Secured Electronic Rating System" herein incorporated by reference. This scoring system taught in the aforementioned patent application (hereinafter referred to as the scoring patent application) allows buyers feedback on purchased products.

The seller is employing the present invention and completing the registration form supplied by the distributor, may be obligated to agree to abide by rules such as covenant not to sue for libel or defamation based upon feedback provided by buyers of the product to the public on the Internet.

The seller's preferred payment plan with the distributor represents a choice of payment plans offered by the distributor such as mail payments or deposit to a seller's bank, etc. The distributor maintains information regarding the seller's product in the catalog system 32 in FIG. 1 located within the distributor's subsystem 20. This information regarding the seller's product is later offered for viewing and studying by potential buyers as will become evident shortly. The seller may also choose to maintain a web site on the Internet him/herself if so desired. In maintaining a web site 30 shown in FIG. 1 on the Internet, the seller may include further information regarding the product being offered for sale such as additional description or various software versions of the same. The seller's web site 30 may be used as a source of providing any revisions or modifications later required to be made to the product by the seller. Potential buyers may directly link to the seller's web site 30 for further product information. The seller may have an interest in maintaining a web site in order to augment the product description provided by the distributor. The distributor will then provide a web link to the seller's web site 30 in order to allow potential buyers to browse the seller's web site 30 for further and more extensive product information. As a caveat, the legal agreement between the seller and distributor should cover any such cross-linking arrangements between the distributor and the seller. The seller's web site 30 may also include at the seller's option, a 900 BUY number for the purpose of purchasing the seller's products using the method taught in the TRY BUY patent application. In this connection, the 900 number is provided at the seller's web site 30 instead of at the TRY server site such as disclosed in the latter patent application. Here again, the legal agreement between the seller and the distributor should clearly define these rights.

One of the features of the present invention includes automation of most all of the steps required in the seller's offering his product for sale in the open market. That is, once the seller registers his/her product by uploading the registration information from the seller's subsystem 10 to the distributor subsystem 20, the distributor subsystem 20 receives and stores the registration information in EKOM registration system 34 and automatically generates product description information and the like based upon the registration information provided by the seller. The generated product description is then stored in catalog system 32. The information automatically generated by the registration information received from the seller in the form of product description may also be transferred to the seller's web site 30 if one is available.

The way in which the distributor system 20 automatically generates product information in the form of HTML web pages by extracting the product information included in the EKOM registration system 34, and adding the HTML "tags" as appropriate to format the web page. Accordingly, it is important for the seller to provide an accurate product description (preferably covered in the legal agreement between the seller and the distributor) and that the description of the product to be in a pre-defined format in accordance with the registration form's format. This will allow the distributor's software to extract the seller's information and, using HTML tags, to package it effectively for product advertising such as during the TRY connection disclosed in the TRY-BUY application. The uploaded registration form information provided by the seller to the distributor's subsystem 20 may include graphics to allow advertising of the seller's product through the use of graphics and potentially JAVA applets. The present invention allows for complete automation of the selling process with little or no human intervention.

System software written to link the seller to the distributor's system 20 allows the seller to call the distributor using path 28 which is through the seller's subsystem 10, local connection 12, and the Internet transmission media 16 to the remote connection 18. The software included in the seller's subsystem 10 negotiates with the software included in the distributor's system 20 via PPP allowing for the downloading of the registration form. The registration form is then completed either off-line or on-line and is uploaded upon completion from the seller's subsystem 10 to the SELL local telcom connection 24 through the switch system 14 to the SELL remote telcom connection 26 and finally to the distributor's system 20, where it is stored in the EKOM registration system 34. This connection through path 28 is set up automatically by the system when the seller dials the 900 number and provides the registration form information. During the connection, the software included in the distributor subsystem 20 cross-checks the seller's caller identification number received from the seller subsystem 10 with the seller's telephone number included in the registration form information provided by the seller subsystem 10.

The seller's product is then uploaded from the seller subsystem 10 through the same path 28 to the distributor subsystem 20 again with the use of system software. The software included in the distributor's system 20 automatically generates the HTML pages for Internet web catalog advertising as may be needed if the teachings of the TRY-BUY patent application are employed.

Accordingly, the present invention offers maximum security via a direct connection through the switching network 14 using a 900 number, yet costs associated therewith are kept minimal in part due to the automation of the registration process, broad market coverage of the product being sold via the Internet, product description generation as well as automated billing and collecting via the 900 number support system. While the seller initiates and has control of the steps and process employed in the present invention, the distributor subsystem 20 is unmanned and fully automated, although the distributor must, of course, maintain the distributor's database included within the distributor's system 20, PSTN connections, Internet access and secondary distribution of proceeds that derive from the sale of the products. With respect to the latter, if the seller and distributor have an agreement wherein the distributor is required to forward a percentage of the sale of each seller's product to the seller, the distributor must keep accurate records of each sale of the product and to periodically remit payments to the seller. The distributor may further agree to have sales records be audited by the seller. The process of tracking sales of the seller's product and remitting payments to the seller may be performed automatically by the software included in the distributor subsystem 20. Due to the software registration or automatic registration features of the present invention, the maintenance required of the distributor subsystem 20 is independent of the number of sellers using or accessing the distributor subsystem 20.

Figure 2:
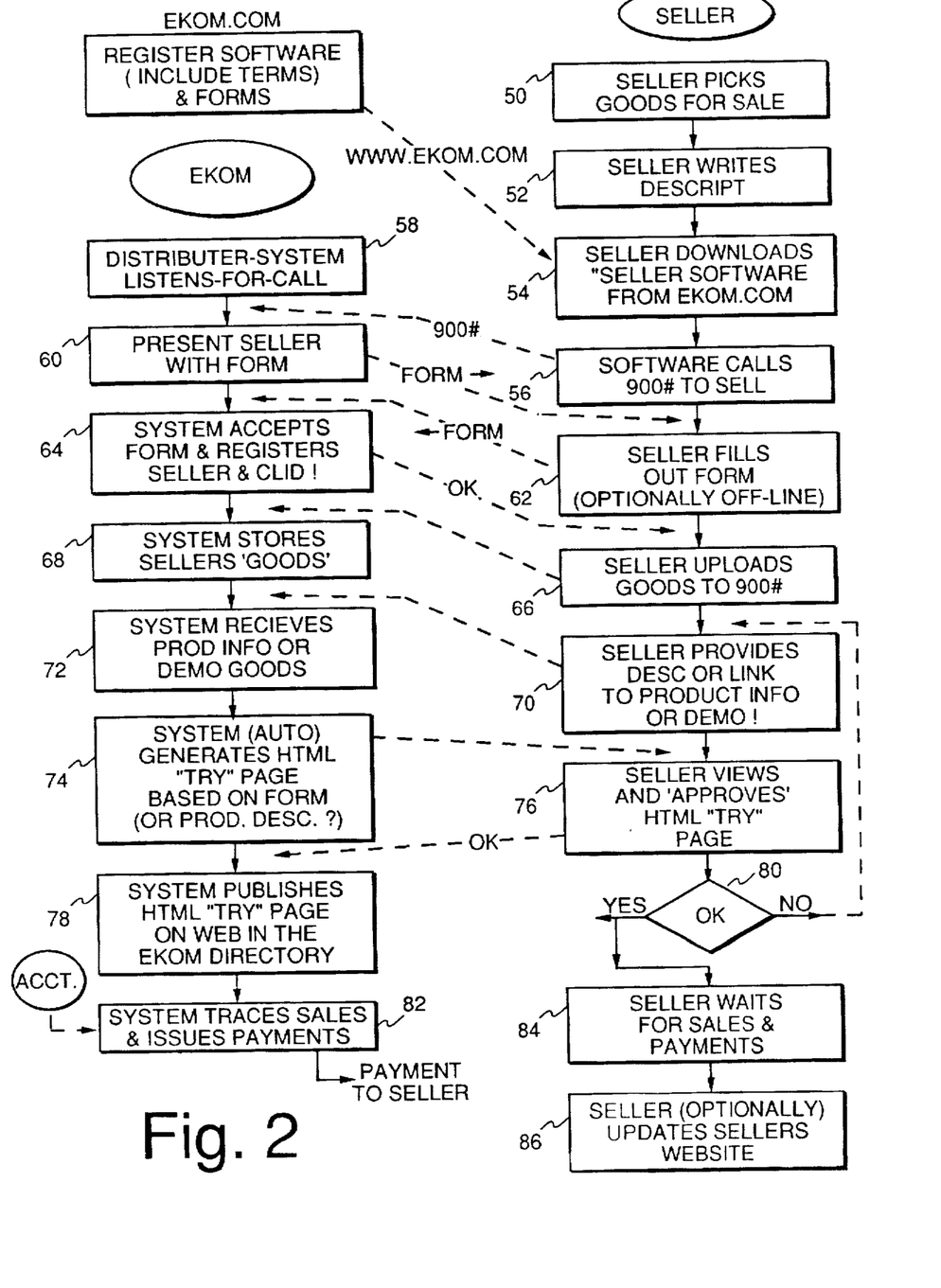
FIG. 2 shows the steps performed by a basic embodiment of the secure electronic selling system.

In an alternate embodiment, the steps of which are shown in FIG. 2, a self-registering automated advertising system is provided to the seller. Most of the procedural steps are common to both a "classified advertising" system, and to the TRY-BUY system. In classified advertising systems, the seller is buying advertising only; the sale is handled by the seller dealing directly with the buyer. In the TRY-BUY system, the distributor not only advertises the products for sale, but also stores and delivers to the buyer, the product. In FIG. 2, the steps performed by the seller's subsystem 10 are outlined in the right side of the figure and the steps taken by the distributor subsystem 20 are presented on the left hand side of the flow chart in FIG. 2. In the case where the seller wishes to sell a software product electronically, in step 50, the seller develops a software product for sale. In step 52 in FIG. 2 the seller writes a description of the product for the purpose of ultimately uploading the same to the distributor. In step 54 the seller downloads registration form which may include terms and conditions of sale and forms supplied by the distributor. Included within the information that is downloaded from the distributor subsystem is the 900 toll telephone number. Additionally, the communication link that is used to transfer or download information from the distributor subsystem to the seller in step 54 is via the Internet transmission media, a packet switching network system. In step 56, the software on the seller's subsystem calls the 900 number that was provided by the distributor some time previously, such as during step 54.

The 900 communication connection is successfully established only when the seller has enabled his caller ID feature. If a seller chooses to suppress his caller ID feature, the 900 call and the registration of the seller's product will be terminated. In other words, the system does not work without the caller ID feature of the seller enabled. Step 58 on the left hand of the figure indicates that the distributor system is listening in for any 900 number calls coming in from potential sellers. Once the 900 number call has been established (this connection may further require a password i.e., an exchange of passwords that is used with PPP negotiations between the seller's system and the distributor's system to establish the 900 call wherein the seller's password is verified with that of what is expected from the distributor. This introduces yet another layer of security to the preferred embodiment), in step 60, the distributor's system presents the seller with a form for completion by the seller. Alternatively, the form could have been downloaded to the seller in step 54, from the distributor's web site. The seller completes the form, (and the seller could do this off-line) upon which the seller's system transfers or uploads the completed form to the distributor's system.

In step 64, the distributor's system accepts the form and registers the seller in part by storing the seller's identification number. One of the ways in which the distributor system accepts the registration form or verifies the seller is by comparing the incoming seller's caller ID number with the telephone number provided by the seller in the completed registration form in step 62. Upon verification of the registration information in step 66, once a confirmation is received from the distributor's system by the seller's system, the seller uploads his/her goods to the distributor's system. In the event hard goods are to be sold, obviously the step of uploading of the product to the distributor is skipped. The distributor's system as shown in step 68 stores the seller's product or goods. In step 70, the seller provides a description of the uploaded product to the distributor by uploading the same to the distributor, unless such information is in the completed form uploaded in step 62. Alternatively, the seller links to the product information and/or provides a demonstration version of the product being sold which is basically a simple test version of the product being sold to afford potential buyers an opportunity to try the product before purchasing it. In other words, the seller in step 70, provides a description of the product being sold or sets up his/her own web site linking to the product information provided by the distributor or provides a demonstration version of the software product being sold. In step 74, the seller has already uploaded the description of the product and perhaps a demonstration version during previous steps, therefore, the distributor's system automatically generates a web page based upon the forms and/or description of the software product that the seller uploaded and does so using HTML code. This page may be the TRY web page that is placed in the TRY server in the TRY-BUY application for potential purchasers to access.

The TRY page is provided to the seller's system in step 76 and the seller reviews and approves the EKOM-generated, HTML-based TRY page. Upon approval of the TRY page in step 78, the distributor's system publishes the HTML TRY page on the web and presents the same in a directory accessible by Internet users. Alternatively, if the seller in step 76 is dissatisfied with the TRY page as indicated in 80, the process flows back to step 70 where the seller provides additions or modifications to the product description and/or links to the product information or provides a different demonstration software, and steps 74, 76 and 78 are performed as discussed above until the seller has approved a TRY page provided by the distributor's system.

In step 82, assuming the web site, including the TRY page is set up, the distributor's system tracks each sale made to buyers of the seller's products and issues payments to the seller upon performing an accounting of the sales. In step 84, the seller waits for sales of his products and payments of the same, and in step 86 the seller optionally updates his/her web site product information.

In FIG. 2, on the left hand side of the drawing steps 58, 60, 64, 68, 72, 74, 78 and 82 are performed by the distributor's system. As indicated earlier, the distributor's system in this case is automated such that the distributor is not required to perform any tasks manually. In effect, the steps shown in the left hand side of the FIG. 2 are performed automatically by the distributor's system. If steps 68 and 82 are omitted, then the system provides a self-registering automated classified advertising system in which the seller performs exactly as described above and provides his/her product in the Internet marketplace to allow potential buyers to contact the seller directly. This is analogous to conventional newspaper classified advertising. A key difference between conventional newspaper classified advertising and the method as described in FIG. 2 is that instead of paying the newspaper agency for advertising the products, the seller pays for the 900 toll number telephone call, in his/her next phone bill. This system will work for software goods as well as hardware goods wherein the latter situation, the seller is provided with an order from the buyer and has to enter in this order through the 900 number call to the distributor's system in order to input the same. While the present invention may be a stand alone invention used for either classified advertising and/or transactions through a distributor, it may nevertheless be combined with the teachings of the TRY-BUY application and the scoring application to effectuate a frictionless system for electronic commerce, thus, enabling small producers of products to obtain shelf space in an optimal fashion at minimum cost. This allows buyers to access product information or demonstration software over the Internet at absolute minimal cost. It provides buyers with secure evaluations compiled from the votes of previous buyers of the product, and it also provides a simple, secure purchasing method based on direct communication over the PSTN and the 900 number toll call mechanism offered and supported by PSTN.

Figure 3:
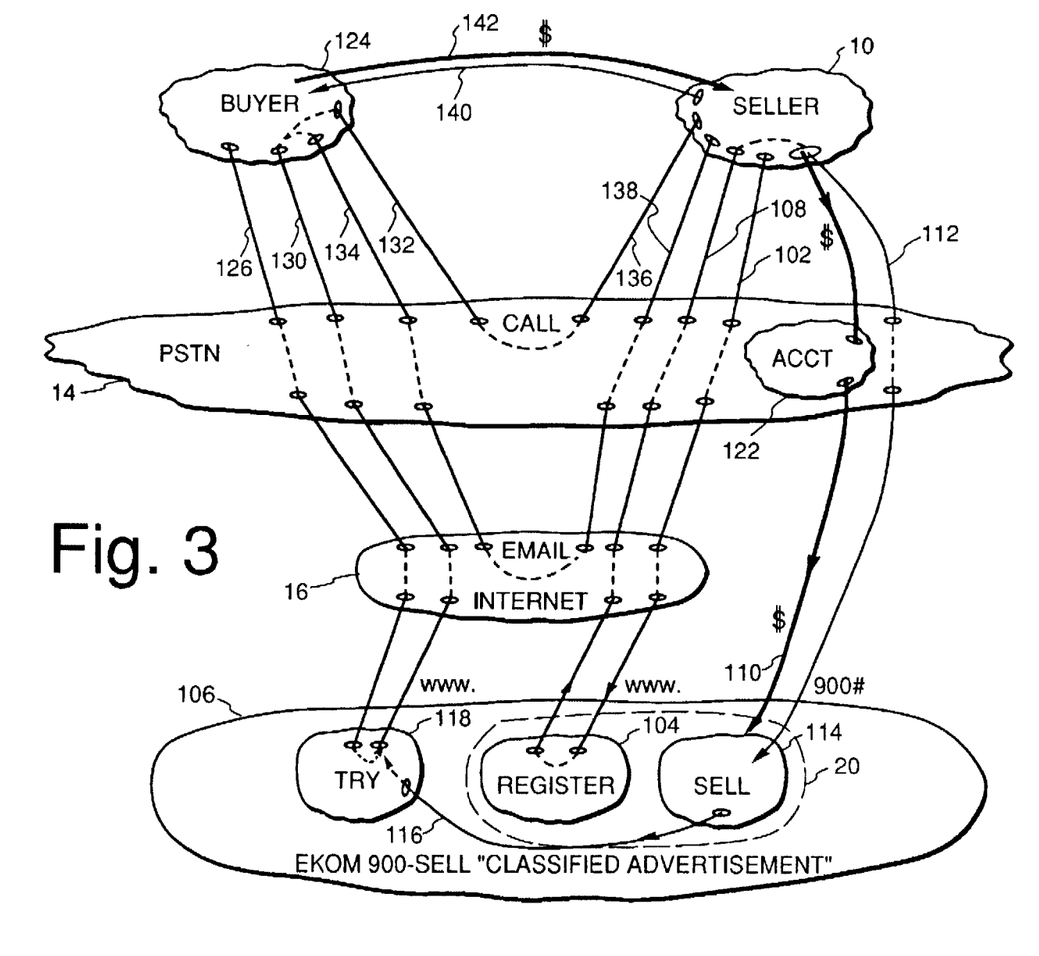
FIG. 3 shows another preferred embodiment that implements a "classified advertising" system.

An integrated system solution uses the teachings of the present invention in combination with the copending TRY-BUY application to offer the only practical system for bringing millions of small content producers to market while minimizing the cost of the transaction and offering lower prices to buyers. In FIG. 3, another preferred embodiment is shown wherein the seller subsystem 10 communicates with the EKOM system 106 through multiple paths. One of these paths is 102 which is through PSTN or switching system 14 and the Internet transmission media 16 to the EKOM system 106. The seller's subsystem 10 initially calls ISP, negotiates through PPP and connects to the EKOM registration system 104 located within the seller subsystem 20. This is done through path 102 as earlier suggested. The seller then downloads from the registration system 104, registration software and perhaps terms and conditions of sales through path 108. The seller then studies the terms and conditions of sale and completes any forms downloaded from path 108. The seller's subsystem 10 then dials a 900 toll telephone number retrieved through path 108 from EKOM system 106 to connect to the SELL subsystem 114 located within the seller subsystem 20, through path 112. Path 112, as can be seen in FIG. 3, does not go through the Internet transmission system. It is rather a physical telephone connection offering a secure communication link between the seller and the EKOM system. The SELL subsystem 114 negotiates PPP and any passwords associated therewith and uploads through path 112 the registration form information completed and provided by the seller. The SELL subsystem 114 then extracts information from the registration form and generates HTML advertisement which is sent to the EKOM TRY subsystem 118 through path 116. As shown, EKOM system 106 includes TRY subsystem 118, registration subsystem 104, and SELL subsystem 114. TRY subsystem 118 at this point contains the product description information, if any, supplied by the seller and any other information the seller may wish to inform potential buyers of to perhaps expedite sales of his/her products. The seller is ultimately charged for the 900 connection through paths 112 and may be furnished with a phone bill to pay for the call by PSTN (provider) or any other carriers in response to an accounting 122 for the call. The PSTN accounting system deducts any fees associated with the call and records payments from the seller. The PSTN accounting system then sends the remaining monies to EKOM system 106 through path 110. It should be noted that the money is sent to a distributor where a distributor is involved in the transaction, as the middle person acting between the seller and the buyer. Alternatively, the money could simply be sent as a classified advertisement expense to whoever maintains the classified ad business. TRY subsystem 118 publishes the information supplied by the seller relative to the seller's product on the web. In this connection, potential web browsers or purchasers using web browsers can view the seller's product and perhaps try it if there is a demonstration software available and provided for by the seller. In the event of a demonstration software, the seller provides the same through the same paths as described above from the seller's subsystem 10 through the SELL system 114 to the TRY subsystem 118. Then the buyer's subsystem 124 is used to connect to ISP wherein a potential buyer negotiates PPP and any passwords associated therewith with the ISPs router. A potential buyer through the buyer's subsystem 124 surfs the web and locates the TRY site or page located within the TRY subsystem 118. This occurs through the path 126 to PSTN 14 and through the Internet transmission media 16 to the TRY subsystem 118. The buyer then downloads through path 130 from TRY subsystem 118 through the Internet transmission media 16 and PSTN 14 the product description provided by the seller and any demonstration software for the purpose of trying the product and/or viewing the product information/description. This is similar to classified advertising such as done in newspapers and magazines where potential buyers flip through the paper in the classified section and determine whether they are interested in purchasing the products being offered for sale. In the same manner, the product being advertised on TRY subsystem 118 in FIG. 3 is viewed by the buyer and downloaded to the buyer's subsystem 124 upon the decision by the buyer to view the demonstration product from TRY subsystem 118.

If the buyer decides to purchase the product, the buyer then places a call to the seller through the path 132 via PSTN 14. The call is received through path 136 by the seller and sale of the product is negotiated between the buyer and the seller. Alternatively, to contact the seller, the buyer may choose to send electronic mail or EMAIL to the seller through path 134 which goes through PSTN 14 as well as the Internet transmission layer 16 through the path 138 to the seller. The buyer, through this path, may request to purchase the product or begin negotiations with the seller. If the seller receives the buyer's EMAIL through path 138, when a price is negotiated, the seller delivers the goods to the buyer through path 140. These goods could be either in software form or in hardware form. Obviously, where hardware goods being sold, the seller may wish to send the product to the buyer, whereas in the case where the product is being purchased as a software good, the seller may choose to deliver the product to the buyer electronically. The purchaser or buyer then pays the seller directly without any middle person, such as a distributor, as shown in path 142. Accordingly, FIG. 3 shows application of the present invention to replace conventional classified advertising in newspapers with electronic methods of advertising.

Figure 4:
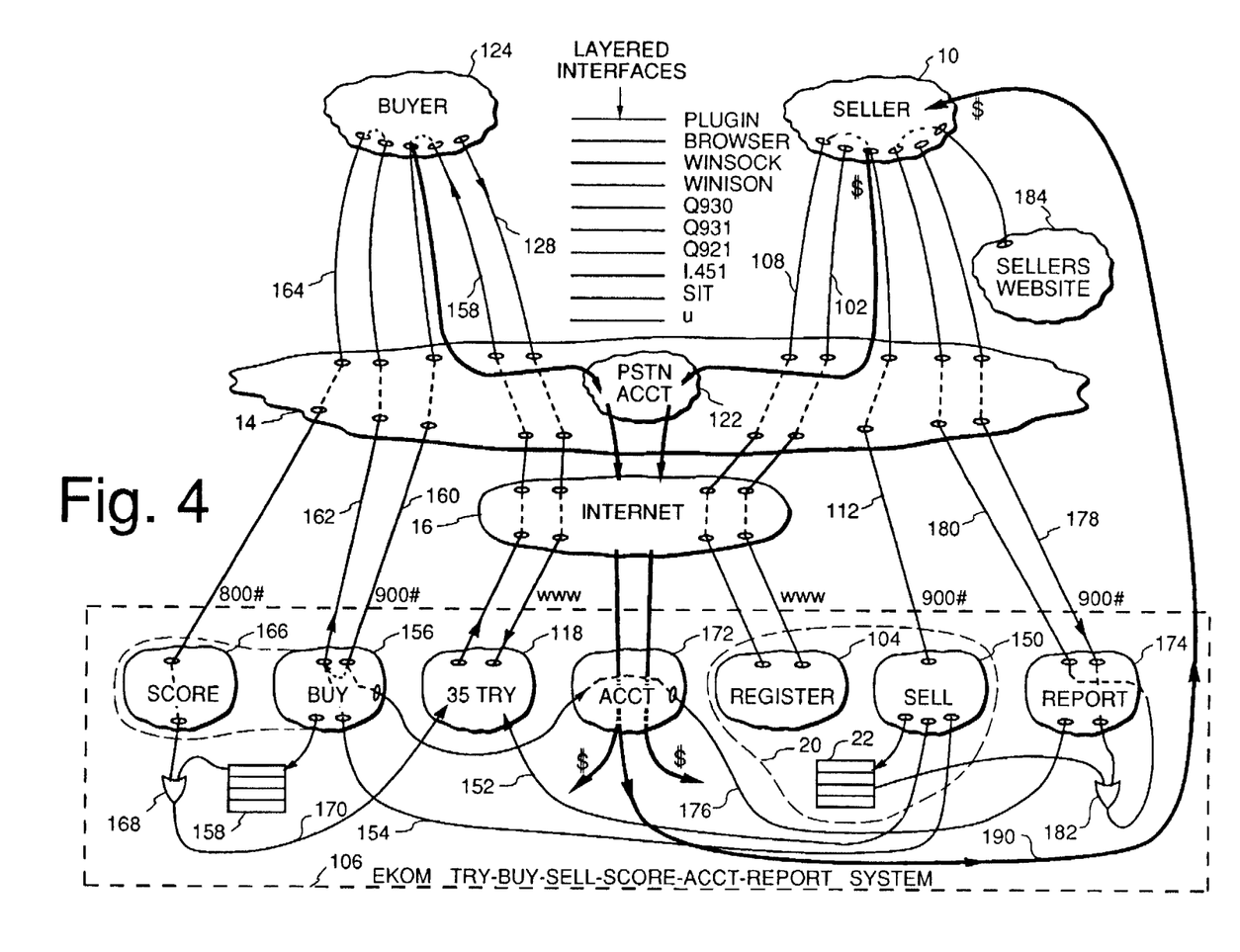
FIG. 4 depicts the integration of a preferred embodiment of the present invention with a TRY-BUY commercial transaction system and an electronic valuation system.

FIG. 4 generally depicts a preferred embodiment of the present invention integrated with the method and apparatus taught in the two aforementioned copending applications, the TRY-BUY application and the score application. In FIG. 4, the seller's subsystem 10 registers his or her product with the EKOM system 106 and specifically the registration subsystem 104 residing within the distributor subsystem 20 which is in turn, within the EKOM system 106. Seller's subsystem 10 registers the product to be sold to the register subsystem 104 through paths 102 and 108 as described in the above.

Next, the seller's subsystem 10 installs or uploads his/her product that is being offered for sale in the SELL subsystem 150, located within the distributor subsystem 20, through a 900 telephone toll connection 112. The 900 number as previously indicated was retrieved by the seller through the registration process. The SELL subsystem 150 receives the uploaded seller's registration form previously completed by the seller and the seller's software product being offered for sale through the 900 toll connection 112 after negotiating PPP with the seller's subsystem 10. The seller's caller ID number is stored in the seller ID list storage location 22 (located within the distributor subsystem 20) and the seller's registration form information and product are stored in SELL subsystem 150.

The seller subsystem 20 extracts the seller's product information and automatically generates a document using HTML code to be transferred to the TRY subsystem 118. The auto-generated HTML document is then transferred to the TRY subsystem 118. TRY subsystem 118 installs the document transferred through path 152 and makes the document or product available on the Internet. It should be noted that the document sent over on path 152 and made available on the Internet may contain a demonstration version of the product being sold in addition to a description of the product. However, it does not include the actual products or goods being offered for sale. Rather, the product being offered for sale is transferred through path 154 from SELL subsystem 150 to the BUY subsystem 156. BUY subsystem 156 stores the product to be sold much like placing products in conventional retail stores on the shelf.

The seller pays for the 900 number call that was placed through path 112 for registering his/her goods through PSTN accounting 122 (telco who then may deduct service charges and forward remaining amount to distributor). This is similar to that of purchasing "shelf space" in conventional marketplace transactions. PSTN accounting 122 subtracts any service fees associated with the 900 call and pays the appropriate party in EKOM system 106 such as the distributors, the remaining monies.

The buyer's system 124 contains plug-ins and hardware driver software, etc. as disclosed in the TRY-BUY application in order to enable the buyer to dial ISP. The buyer's subsystem 124 connects to ISP router via PPP with any passwords exchanged accordingly. The buyer then connects to the EKOM system 106 and specifically the TRY subsystem 118 through the Internet transmission media 16. Again, details of this TRY and BUY implementation are disclosed in the copending application. The connection through the Internet is made through path 158 from the buyer subsystem 124 to the TRY subsystem 118. The buyer tries a demonstration version of the product advertised by TRY subsystem 118 by downloading the same from TRY subsystem 118 through path 158. The buyer may also receive through the same path, any product information provided by the seller and stored on the TRY subsystem 118 which may be included within this information. This could be score or evaluation information regarding the performance of the product as perceived by previous purchasers of the products. The buyer then proceeds to study the information downloaded and/or try the demonstration software downloaded. Ultimately, the buyer makes a decision as to whether he/she is interested in purchasing the product.

Assuming the buyer wishes to purchase the product, the buyer's subsystem 124 dials the 900 toll telephone number provided by TRY subsystem 118 through the download path 158. The 900 toll connection 160 is a physical secure communication link that does not go through the Internet transmission system 16. BUY subsystem 124 negotiates PPP and any password associated therewith with BUY subsystem 156 through paths 160 and 162. Furthermore, there may be pricing negotiations performed between the buyer's subsystem 124 and BUY subsystem 156. Upon successful negotiations of PPP and password exchange, BUY subsystem 156 stores the caller ID number associated with buyer subsystem 124 at the outset of the 900 call connection from the buyer's subsystem 124 into buyer caller ID lookup table 158. Caller ID lookup table 158 is a storage location for storing the purchaser's caller ID numbers when purchasers call in through the 900 number to purchase a product. In this regard, the lookup table 158 adds another layer of security to the system as will be apparent shortly. BUY subsystem 156 downloads the software goods purchased by the buyer through path 162 to the buyer's subsystem 124. Obviously when there are hardware goods purchased, this download does not take place. Although the same system may be used for purchasing hardware goods where an order form is completed by the buyer as disclosed in the TRY-BUY application.

Once the buyer has the product of interest, he may choose to utilize this product, and after a certain period of use provide the seller, and more importantly, other potential purchasers of the product, with feedback in the form of an evaluation of the purchased product. If the buyer chooses to do so, the buyer's subsystem 124 calls an 800 toll-free number provided by the seller through either TRY subsystem 118 or as part of the product downloaded from BUY subsystem 156. The 800 communication link 164 is again a secure physical link providing privacy for the information the buyer may provide regarding the product. Additionally, the seller is potentially interested in encouraging buyers to evaluate the product and therefore offer an 800 toll free number to do the same. Through path 168, the buyer's subsystem connects to the score subsystem 166 wherein the buyer's caller ID number retrieved from the path 164 is retrieved and thereafter compared to the list of caller ID numbers stored in lookup table 158 by comparator 168. Upon verification of the buyer's caller ID number against the caller ID numbers in the lookup table 158, the buyer's evaluation input is provided through path 170 to TRY subsystem 118 for viewing by other potential buyers of the product.

It should be noted that score subsystem 166 also negotiates PPP and any passwords associated therewith with the buyer's subsystem 124 during the 800 call. It should be further noted that the score subsystem 166 may physically be a part of the BUY subsystem 156 as can the comparator 168 and lookup table 158. Upon a successful comparison of the caller ID number coming in through the 800 call and a caller ID number stored in the lookup table 158 and storage of the buyer's evaluation information on TRY subsystem 118, the buyer's caller ID number is deleted from the lookup table 158 to prevent additional scores provided by the same buyer. Every time a sale is made through path 160 from the buyer's subsystem 124 to BUY subsystem 156, the information is recorded in the accounts subsystem 172. Account subsystem 172 extracts the relevant information regarding the sales of the product and sends the same to the report subsystem 174 as indicated by path 176. The seller may at his/her discretion connect with the report subsystem 174 through path 178 from seller subsystem 10. This connection would be through a 900 number provided at the time of registration, or available at a specified web site. In this respect, the seller by paying for a 900 toll connection, may obtain reports on his/her product and perhaps competitor's sales reports. The sales reports are downloaded through path 180 from report subsystem 174 to the seller's subsystem 10. If the sellers caller ID number retrieved from the 900 communication link 178 compares successfully to at least one of the caller ID numbers in the seller ID list 22. This or verification is performed by comparator 182, and if successful, meaning the seller has previously registered with the EKOM system 106, the seller may optionally receive a report of his/her product. The report may contain sales information. The report maintained within the report subsystem 174 is downloaded to the seller's subsystem 10 through path 180. The seller may, upon receiving the report, use the report to plan future selling strategies and the like.

The seller may optionally choose to have his/her own web site as previously indicated. Thus, the seller web site 184 if employed, keeps updates or modifications to the seller's products. In this situation, during the registration of the seller and his products, the seller supplies a URL link to the seller's web site 184 in order to augment the EKOM TRY information on the TRY page site regarding the seller's product. Furthermore, there is a link between TRY subsystem 118 and the seller's web site 184 through the Internet transmission media 16 (not shown). Upon purchasing the product, the buyer is sent a bill from PSTN or a carrier for the cost of the product plus services and fees associated therewith. Buyer then sends payment to PSTN and the latter subtracts any fees and sends the remaining portion of the buyer's payment to EKOM accounts subsystem 172. EKOM account subsystem 172 records the buyer's payment and determines disposition of the same. EKOM account subsystem 172 then sends the remaining portion of the monies collected for the purchase of the product to the seller through path 190 which is shown in FIG. 4 as being partially outside of the EKOM system 106 for the purpose of illustrating that distribution of payments to the buyer may be performed by other than electronic methods such as simply mailing a check to the seller. In this way, the seller receives funds from the buyer's purchase of the seller's product. If a distributor were involved in the selling process, or if the registration of the seller was automated as indicated previously, the software required to automate seller's registration would perform the following steps:

The Auto Soft "Sell" State Machine

To operate an EKOM AutoSoft™ system

1. Install EKOM server at web address
2. Publish instructions web address
3. Publish 900# at EKOM web address.
4. Make registration forms and "plug-in" software available from web.
5. Wait for Sellers to call 900# with registration form filled out.
6. Records Caller ID and negotiate PPP with Seller.
7. Upload Sellers "Product" to be put on "shelf".
8. Generate HTML product description from Sellers formal input.
9. Publish Sellers product description and 900# in "catalog" on web.
10. Wait for Buyers to call 900#

These steps would be done by the software that would be incorporated in the EKOM system 106. On the seller's side in seller's subsystem 10, the seller's subsystem 10 would require the following steps in order to automatically register the seller the software would conduct the following steps.

To become a seller:

a. create a JAVA class or applet (or story, etc.)
b. Write an HTML description of the product
c. Decide which "market" you wish to serve.
d. Download Sellers package from EKOM web page.
e. Fill out forms offline.
   User Name
   User Address (mail)
   User E-mail
   User Tel# (work)
   User Tel# (home)
   User Tel# (add'l)
   User Name of Product
   User Description of Product
   User Requested Product Categories
   User Size of Files
   User Price to be posted
   User Preferred Payment Method
   User Payment Acct #
   User Agreement
f. Call "900-FOR-SELL"-type number (from EKOM web page).

g. Negotiate PPP ++, register password h. Upload the previously filled out forms.

i. Agree to license terms j. EKOM system records Sellers caller ID.

k. System reads form
   k1. System uploads "DEMO"
   k2. System uploads "PRODUCT"
   k3. System installs "DEMO" on www page HTML
   k4. System installs "PRODUCT" at 900# server
   k5. System "publishes" "PRODUCT" in market place l. System supports "DEMO" on www (or 800#)

m. System supports "PRODUCT" @ 900# n. Telco collects for 900# calls o. Telco pays EKOM [with appropriate documentation]

p. EKOM system pays subscribing sellers q. EKOM System tracks sales, records statistics, maintains audit trail and generates accounting reports.

To become a buyer:

1. Seller calls 900# to download Demo to system
2. Seller calls 900# to download goods to system
3. Buyer browses www (or 800#) for Demo and Score
4. Buyer calls 900# to download product (or order goods)
5. System stores caller ID of all Buyers
6. Buyer (optionally) calls scorebox # (or www)
7. If scorer's CLID matches stored Buyer's CLID, then record Score
8. Remove Buyers CLID to prevent multiple Scores (one vote per BUY)
9. Allow unsolicited scores to show in non-official
10. Allow development of detailed score/critiques by categories etc.

Within EKOM system 106 may lie three physically independent servers (TRY, BUY and SELL servers), one for BUY subsystem 156, one for TRY subsystem 118, and one for the seller subsystem 20. The BUY subsystem server may include the account subsystem 172, lookup table 158, comparator 168 and score subsystem 166. Alternatively, account subsystem may be included in the seller subsystem server or, least likely, the TRY subsystem server.

Similarly, report subsystem 174 and comparator 182 may reside in the seller subsystem server. The three servers for TRY, BUY and SELL referred to above, may be physically located far apart from each other such as when a company having geographically separated sites wishes to employ the present invention and must place each server at a different site. Also, where a distributor maintains the seller subsystem server, it may be geographically located apart from the BUY subsystem server and TRY subsystem server wherein the latter two servers may be maintained by a different party or entity. Alternatively, the three servers may be physically located close to each other or may even be physically in the same system.

Although the present invention has been described in terms of specific embodiments it is anticipated that alterations and modifications thereof will no doubt become apparent to those skilled in the art. It is therefore intended that the following claims be interpreted as covering all such alterations and modifications as fall within the true spirit and scope of the invention.

What I claim is:

1. A method of establishing a secure communication link for enabling a seller to supply products to a distributor through electronic media comprising:

providing a local communication subsystem at a local location accessible to a seller and responsive to seller input, said local subsystem having an identifying number associated therewith for transmission to a remote subsystem;

providing a remote communication subsystem located at a remote location for receiving and storing said identifying number, said remote subsystem having electronic registration forms remotely selectable by the seller;

establishing a first communication link between the local subsystem, wherein said first communication link uses the Internet transmission media and the remote subsystem;

selecting a registration form through the first communication link;

downloading the selected registration form through the first communication link;

using the downloaded form for input of registration data;

retrieving through the first communication link a telephone toll number associated with the registration form;

using said retrieved telephone number to establish a telephone toll connection through a second communication link between the local subsystem and the remote subsystem;

transferring said identifying number through the second communication line to the remote subsystem for storage;

uploading the input registration data from the local subsystem to the remote subsystem through said second communication link; and uploading the seller's product through the second communication link from the local subsystem to the remote subsystem, whereby during the product uploading, a fee is assessed and charged at a rate determined by the toll connection provider, and after said product uploading, the uploaded product is offered for sale to the general public.

2. A method of establishing a secure communication link as recited in claim 1, wherein said input registration data includes a telephone number of the seller.

3. A method of establishing a secure communication link as recited in claim 2, wherein during said telephone toll connection, said identifying number is transferred from the local subsystem to the remote subsystem and stored in the remote subsystem for verification against said seller telephone number.

4. A method of establishing a secure communication link as recited in claim 3, further including the step of uploading a demonstration version of the product through said second communication link.

5. A method of establishing a secure communication link as recited in claim 4, wherein said telephone toll number is a 900 number from a predetermined toll-charging telephone numbering system.

6. A method of establishing a secure communication link as recited in claim 5, wherein said registration data includes a password for further identification of the seller to the distributor.

7. A method of establishing a secure communication link as recited in claim 6, wherein the distributor automatically generates advertising information including description of the product for presentation to the potential buyers.

8. A method of establishing a secure communication link as recited in claim 1, further including the step of uploading a demonstration version of the product through said second communication link.

9. A method of establishing a secure communication link as recited in claim 1, wherein said toll number is a 900 number from a predetermined toll-charging telephone numbering system.

10. A method of establishing a secure communication link as recited in claim 1, wherein said registration data includes a password for further identifying the seller to the distributor.

11. A communication system for establishing a secure communication link for enabling a seller to supply products to a distributor through electronic media comprising:

a local subsystem disposed at a local location and accessible to a user, said local subsystem being responsive to a user input and operative to generate communicative data corresponding thereto, said local subsystem having an identifying number associated therewith for transmission to a remote subsystem;

means establishing a first communication link for communicating said communicative data to a remote location, wherein said first communication link uses the Internet transmission media;

a remote subsystem located at said remote location for receiving said communicative data and in response thereto transmitting electronic registration data for completion by the user and a telephone toll number associated therewith through said first communication link to said local subsystem;

means using the transmitted toll number to establish a second communication link between said local subsystem and said remote subsystem through which the identifying number is transferred from the local subsystem to the remote subsystem;

said local subsystem including means for uploading the completed registration data to the remote subsystem through said second communication link; and means for uploading the product to the remote subsystem through said second communication link; and said remote subsystem including means for storing said uploaded product, whereby a fee is assessed and charged at a rate determined by the toll connection provider for uploading the product and further wherein said uploaded product is offered for sale to the general public.

12. A communication system as recited in claim 11, wherein said toll number is a 900 number from a predetermined toll-charging telephone numbering system.

13. A method of establishing communication links for enabling a seller of a product to securely communicate the product to a distributor through electronic media for advertising the product to potential purchasers through electronic media and for establishing communication links to securely transfer the product to a buyer through secure electronic media, said method comprising:

establishing a first communication link between a seller communication subsystem and a remote communication subsystem, said seller subsystem having a seller identifying number and said remote subsystem having a registration form, wherein said first communication link uses the Internet transmission media;

downloading through said first communication link, said registration form to said seller subsystem;

using the form for input of registration data;

retrieving through said first communication link, a registration telephone toll number;

using said registration toll number to establish a registration telephone toll connection through a second communication link between said seller subsystem and said remote subsystem;

causing said seller subsystem to transmit said seller identifying number to said remote subsystem through said second communication link;

storing the transmitted seller identifying number in said remote subsystem;

uploading the input registration data from the seller subsystem to the remote subsystem through said second communication link;

uploading the product through the second communication link from the local subsystem to the remote subsystem whereby during said product uploading, a fee is assessed and charged at a rate determined by the registration toll connection provider;

extracting product description information from the uploaded registration data for use by the distributor in advertising the product;

establishing a third communication link between a buyer subsystem and the remote subsystem, said buyer subsystem having a buyer identifying number associated therewith;

selecting the advertised product through said third communication link;

retrieving a BUY telephone toll number associated with the product through said third communication link;

using the retrieved BUY toll number to establish a BUY telephone toll connection through a fourth telephone toll communication link between the buyer subsystem and the remote subsystem;

transmitting the buyer identifying number from the buyer subsystem through said fourth communication link to the remote subsystem;

storing the transmitted buyer identifying number in the remote subsystem; and downloading the product from said remote subsystem to said buyer subsystem through said fourth communication link whereby during said downloading of the product, a fee is assessed and charged at a rate determined by the buy toll connection provider.

14. A method of establishing communications links as recited in claim 13, wherein said third communication links uses the Internet transmission media.

15. A method of establishing communication links as recited in claim 13, wherein said registration toll number and said BUY toll number are 900 numbers from a predetermined toll-charging telephone numbering system.

16. A method of establishing communication links as recited in claim 13, further including:

retrieving from the remote subsystem through said third communication link a telephone toll-free number associated with the product;

using said retrieved toll-free number to establish a fifth communication link between the remote subsystem and the buyer subsystem;

transmitting the buyer identifying number from the buyer subsystem through said fifth communication link to the remote subsystem;

verifying the buyer identifying number transmitted through said fifth communication link with the stored buyer identifying number; and transmitting evaluation information data associated with the downloaded product from the buyer subsystem through said fifth communication link to the remote subsystem for presentation to potential purchasers of the product.

17. A method of establishing communication links as recited in claim 16, wherein said toll-free number is an 800 number from a predetermined toll-free telephone numbering system.

* * * * *